United States Patent
Fumia, Jr. et al.

[15] 3,655,392
[45] Apr. 11, 1972

[54] PHOTOGRAPHIC SILVER HALIDE EMULSION SENSITIZED WITH A METHINE DYE

[72] Inventors: Arthur Fumia, Jr., Hilton; Leslie G. S. Brooker, Rochester, both of N.Y.

[73] Assignee: Eastman Kodak Company, Rochester, N.Y.

[22] Filed: June 4, 1969

[21] Appl. No.: 830,483

[52] U.S. Cl. ................................................96/131
[51] Int. Cl. .............................................G03c 1/08
[58] Field of Search ...........................96/131, 136

[56] References Cited

UNITED STATES PATENTS 2,956,881   10/1960   Van Lare ..............................96/102

FOREIGN PATENTS OR APPLICATIONS 674,800   1/1965   Belgium

*Primary Examiner*—Norman G. Torchin
*Assistant Examiner*—John L. Goodrow
*Attorney*—W. H. J. Kline, J. R. Frederick and O. H. Webster

[57] ABSTRACT

Novel cyanine and merocyanine dyes are provided which feature a nucleus selected from the group consisting of a 1-(3,4,4a,5,6,7-hexahydro-2-naphthyl)pyrrolidine group, a 1-(3,3a,4,5-tetrahydro-2H-inden-6-yl)pyrrolidine group, a 1-(2-norbornylidene)-pyrrolidine group, and a 1-(1-indanylidene)pyrrolidine group.

14 Claims, No Drawings

PHOTOGRAPHIC SILVER HALIDE EMULSION SENSITIZED WITH A METHINE DYE

This invention relates to novel methine dyes, and more particularly to enamine dyes and photographic emulsions and elements containing these dyes; and, to the preparation of these novel dyes.

A number of methine dyes derived from certain enamine derivatives having utility as spectral sensitizers for photographic silver halide emulsions have been previously disclosed. For example, in Belgian Patent No. 674,800, dated Jan. 3, 1966, methine dyes derived from N-cyclopentenyl-pyrrolidine and related enamines are described. However, it has been noted that such prior art dyes tend to be contaminated with bis dyes due to the enamine intermediates having more than one reactive position. Dyes entirely free from such bis dye by-products would, therefore, appear to have significant advantages in the preparation procedure and uses thereof as spectral sensitizers in the photographic art over prior art dyes such as mentioned above.

It is, accordingly, an object of this invention to provide a new class of methine dyes derived from enamines that are free from bis type contaminations.

Another object of this invention is to provide novel photographic silver halide emulsions containing one or more of the new dyes as spectral sensitizers therefor.

Still another object of this invention is to provide light-sensitive photographic elements comprising a support having thereon at least one novel emulsion layer of the invention.

Another object of this invention is to provide means for preparing these new dyes and novel photographic materials.

Other objects of this invention will be apparent from this disclosure and the appended claims.

We have now made the important discovery that methine dyes can be derived from certain enamines containing two fused carbocyclic rings that form part of the methine chain, and that these dyes are free from any noticeable bis dye contaminations. These novel dyes are excellent spectral sensitizers for light-sensitive photographic silver halide emulsions up to wavelengths ranging about from 520 to 750 nm., with maximum sensitivities occuring in the range about from 490 to 700 nm. Thus, these dyes sensitize not only from the blue to the red regions, but in many cases in the near infrared regions of the spectrum. In general, the novel dyes of this invention cause only very low fog level in both fresh and incubated emulsions, and the negative images produced with emulsions containing these dyes are clear and sharp, and of excellent contrast.

The novel methine dyes of this invention include those comprising first and second nuclei joined by a double bond or methine linkage (including one or more methine groups); the first of said nuclei being selected from the group consisting of (1) a nitrogen containing heterocyclic nucleus of the type used in cyanine dyes having from 5 to 6 non-metallic atoms in the heterocyclic ring, and (2) a nitrogen containing heterocyclic ketomethylene nucleus of the type used in merocyanine dyes having from 5 to 6 non-metallic atoms in the hetrocyclic ring, joined in each instance by a carbon atom of (1) or (2) to said linkage; and said second nucleus being an enamine group selected from the group consisting of a 1-(3,4,4a,5,6,7-hexahydro-2-naphthyl)-pyrrolidine group, a 1-(3,3a,4,5-tetrahydro-2H-inden-6-yl)-pyrrolidine group, a 1-(2-norbornylidene)pyrroline group and a 1-(1-indanylidene)pyrrolidine group, joined at a carbon atom thereof to said linkage, to complete said dye.

The preferred novel methine dyes of the invention that are particularly useful include those represented by the following formulas:

I.

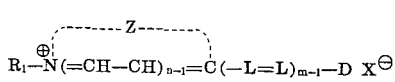

and

II

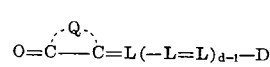

wherein n and d each represents a positive integer of from 1 to 2; m represents a positive integer of from 1 to 3; L represents a methine linkage, e.g., $=CH-$, $=C(CH_3)-$, $=C(C_6H_5)-$, etc.; D represents an enamine group selected from a 2,3,4,4a,5,6hexahydro-7-(1-pyrrolidinyl)-1-naphthyl group, a 2,6,7,7a-tetrahydro-5-(1-pyrrolidinyl)-3-indenyl group, a 3-(1-pyrrolidinyl)-2-norbornen-2-yl group or a 3-(1-pyrrolidinyl)-2-indenyl group, represented by the following basic structures:

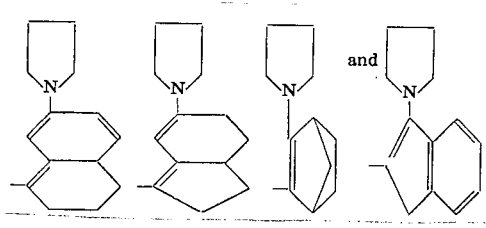

which groups can be further substituted on appropriate nuclear carbon atoms thereof by alkyl, e.g., methyl, butyl, etc., or alkoxy, e.g., methoxy, butoxy, etc., and the like; $R_1$ represents an alkyl group, including substituted alkyl, (preferably a lower alkyl containing from 1 to 4 carbon atoms),e.g.,methyl,ethyl,propyl, isopropyl, butyl,hexyl,cyclohexyl, decyl, dodecyl, etc., and substituted alkyl groups (preferably a substituted lower alkyl containing from one to four carbon atoms), such as a hydroxyalkyl group, e.g., β-hydroxyethyl, ω-hydroxybutyl, etc., an alkoxy-alkyl group, e.g., β-methoxyethyl, ω-butoxybutyl, etc., a car-boxyalkyl group, e.g., β-carboxyethyl, ω-carboxybutyl, etc.; a sulfoalkyl group, e.g., β-sulfoethyl, ω-sulfobutyl,etc., a sulfatoalkyl group, e.g., β-sulfatoethyl, ω-sulfatobutyl, etc., an acyloxyalkyl group, e.g., β-acetoxyethyl, γ-acetoxypropyl, ω-butyryloxybutyl, etc., an alkoxycarbonylalkyl group, e.g., β-methoxycarbonylethyl, ω-ethoxycarbonylbutyl, etc., or an aralkyl group e.g., benzyl, phenethyl, etc., or any aryl group,e.g., phenyl, tolyl, naphthyl, methoxyphenyl, chlorophenyl, etc.; X represents an acid anion, e.g., chloride, bromide, iodide, perchlorate, sulfamate, p-toluenesulfonate, methylsulfate, etc., and can be included in $R_1$, such as when $R_1$ represents a carboxyalkyl or sulfoalkyl group and the dye is in the form of an internal anhydride; Z represents the non-metallic atoms necessary to complete the same or different 5- to 6-membered heterocyclic nucleus of the type used in cyanine dyes, which nucleus may contain a second hetero atom such as oxygen, sulfur, selenium or nitrogen, such as the following nuclei: a thiazole nucleus, e.g., thiazole, 4-methylthiazole, 4-phenylthiazole, 5-methylthiazole, 5-phenylthiazole, 4,5-dimethylthiazole, 4,5-diphenylthiazole, 4-(2-thienyl)thiazole, benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 5-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, naphtho[2,1-$d$]thiazole, naphtho[1,2-$d$]thiazole, 5-methoxynaphtoh[2,3-$d$]thiazole, 5-ethoxynaphtho[2,3-$d$]thiazole, 8-methoxynaphtho[2,3-$d$]thiazole, 7-methoxynaphtho[2,3-$d$]thiazole, 4′-methoxythianaphtheno-7′,6′,-4,5-thiazole, etc.; an oxazole nucleus, e.g., 4-methyloxazole, 5-methyloxazole, 4-phenyloxazole, 4,5-diphenyloxazole, 4-ethyloxazole, 4,5-dimethyloxazole, 5-phenyloxazole, benzoxa-zole, 5-chlorobenzoxazole, 5-methylbenzoxazole, 5-phenylbenzox-azole, 6-methylbenzoxazole, 5,6-dimethylbenzoxazole, 4,6-di-methylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole, naphtho[2,1-$d$]oxazole, naphtho[1,2-$d$]-oxazole, etc.; a selenazole nucleus, e.g., 4-methylselenazole, 4-phenylselenazole, benzoselenazole, 5-chlorobenzoselenazole, 5- methoxybenzoselenazole, 5-hydroxybenzoselenazole, tetrahydrobenzoselenazole, naphtho[2,1-d]selenazole, naphtho[1,2-d]selenazole, etc.; a thiazoline nucleus, e.g., thiazoline, 4-methylthiazoline, etc.; a pyridine nucleus, e.g., 2-pyridine, 5-methyl-2-pyridine, 4-pyridine, 3-methyl-4-pyridine, etc.; a quinoline nucleus, e.g., 2-quinoline, 3-methyl-2-quinoline, 5-ethyl-2-quinoline, 6-chloro-2-quinoline, 8-chloro-2-quinoline, 6-methoxy-2-quinoline, 8-ethoxy-2-quinoline, 8-hydroxy-2-quinoline, 4-quinoline, 6-methoxy-4-quinoline, 7-methyl-4-quinoline, 8-chloro-4-quinoline, 1-isoquinoline, 3,4-dihydro-1- isoquinoline, 3-isoquinoline, etc.; a 3,3-dialkylindolenine nucleus, e.g., 3,3-dimethylinolenine, 3,3,5-trimethylindolenine, etc.; and, an imidazole nucleus, e.g., imidazole, 1-alkylimidazole, 1-alkyl-4-phenylimidazole, 1-alkyl-4,5-dimethylimidazole, benzimidazole, 1-alkyl-benzimidazole, 1-aryl-5,6-dichlorobenzimidazole, 1-alkyl-1H-naphth[1,2-d]imidazole, 1-aryl-3H-naphth[1,2-d]imidazole, 1-alkyl-5-methoxy-1H-naphth-[1,2-d]imidazole, etc.; and Q represents the non-metallic atoms necessary to complete a 5- or 6-membered nucleus, of the type used in merocyanine dyes typically containing a hetero atom selected from nitrogen, sulfur, selenium, and oxygen, such as a 2-pyrazoline-5-one nucleus, e.g., 3-methyl-1-phenyl-2-pyrazolin-5-one, 1-phenyl-2-pyrazolin-5-one, 1-(2-benxothiazolyl)-3-methyl-2-pyrazolin-5-one, etc.; an isoxazolone nucleus, e.g., 3-phenyl-5(4H)-isoxazolone, 3-methyl-5(4H)-isoxazolone, etc.; an oxindole nucleus, e.g., 1-alkyl-2-oxindoles, etc.; a 2,4,6-triketohexahydropyrimidine nucleus, e.g., barbituric acid or 2-thiobarbituric acid as well as their 1-alkyl (e.g., 1-methyl, 1-ethyl, 1-propyl, 1-heptyl, etc.) or 1,3-dialkyl(e.g., 1,3-dimethyl, 1,3-diethyl, 1,3-di-propyl, 1,3-diisopropyl, 1,3-dicyclohexyl, 1,3-di(β-methoxyethyl), etc.; or 1,3-diaryl (e.g., 1,3-diphenyl, 1,3-di-(p-chlorphenyl), 1,3-di(p-ethoxycarbonylphenyl), etc.); or 1-aryl (e.g., 1-phenyl, 1-p-chlorophenyl, 1-p-ethoxycarbonylphenyl), etc.) or 1-alkyl-3-aryl (e.g., 1-ethyl-3-phenyl, 1-n-heptyl-3-phenyl, etc.) derivatives; a rhodanine nucleus (i.e., 2-thio-2,4-thiazolidinedione series), such as rhodanine, 3-alkylrhodanines, e.g., 3-ethylrhodanine, 3-allylrhodanine, etc., 3-carboxyalkylrhodanines, e.g., 3-(2-carboxyethyl)rhodanine, 3-(4-carboxybutyl)rhodanine, etc., 3-sulfoalkylrhodanines, e.g., 3-(2-sulfoethyl)rhodanine, 3-(3-sulfopropyl)rhodanine, 3-(4-sulfobutyl)rhodanine, etc., or 3-arylrhodanines, e.g., 3- phenylrhodanine, etc., etc.; a 2(3H)-imidazo[1,2-a]pyridone nucleus; a 5,7-dioxo-6,7-dihydro-5-thiazolo[3,2-a]pyrimidine nucleus, e.g., 5,7-dioxo-3-phenyl-6,7-dihydro-5-thiazolo[3,2-a]-pyrimidine, etc.; a 2-thio-2,4-oxazolidinedione nucleus (i.e., those of the 2-thio-2,4(3H,5H)-oxazoledione series) e.g., 3-ethyl-2-thio-2,4-oxazolidinedione,3-(2-sulfoethyl)-2thio-2,4-oxazolidinedione,3-(4-sulfobutyl)-2-thio-2,4-oxazolidinedione, 3-(3-carboxypropyl)-2-thio-2,4-oxazolidinedione, etc.; a thianaphthenone nucleus, e.g., 3-(2H)-thianaphthenone, etc.; a 2-thio-2,5-thiazolidinedione nucleus (i.e., the 2-thio-2,5-(3H,4H)-thiazoledione series), e.g., 3-ethyl-2-thio-2,5-thiazolidinedione, etc; a 2,4-thiazolidinedione nucleus, e.g., 2,4-thiazolidinedione, 3-ethyl-2,4-thiazolidinedione, 3-phenyl-2,4-thiazolidinedione, 3-α-naphthyl-2,4-thiazolidinedione, etc.; a thiazolidinone nucleus, e.g., 4-thiazolidinone, 3-ethyl-4-thiazolidinedione 3-phenyl-4-thiazolidinone, 3-α-naphthyl-4-thiazolidinone, etc; a 2-thiazoline-4-one nucleus, e.g., 2-ethylmercapto-2-thiazoline-4-one, 2-alkylphenylamino-2-thiazolin-4-one, 2-diphenylamino-2-thiazolin-4-one, etc; a 2-imino-4-oxazolidinone (i.e., pseudohydantoin) nucleus; a 2,4-imidazolidinedione (hydantoin) nucleus, e.g., 2,4-imidazolidinedione, 3-ethyl-2,4-imidazolidinedione, 3-phenyl-2,4-imidazolidinedione, 3-α-napthyl-2,4-imidazolidinedione, 1,3-diethyl-2,4-imidazolidinedione, 1-ethyl-3-phenyl-2,4-imidazolidinedione, 1-ethyl-3-α-naphthyl-2,4-imidazolidinedione, 1,3-diphenyl-2,4-imidazolidinedione, etc; a 2-thio-2,4-imidazolidinedione (i.e., 2-thiohydantoin) nucleus, e.g., 2-thio-2,4-imidazolidinedione, 3-ethyl-2-thio-2,4-imidazolidinedione, 3-(4-sulfobutyl)-2-thio-2,4-imidazolidinedione, 3-(2-carboxyethyl)-2-thio-2,4-imidazolidinedione, 3-phenyl-2-thio-2,4-imidazolidinedione, 3-α-naphthyl-2-thio-2,4-imidazolidinedione, 1,1,3-diethyl-2-thio- 2,4-imidazolidinedione, 1-ethyl-3-phenyl-2-thio-2,4-imidazolidinedione, 1-ethyl-3-α-naphthyl-2-thio-2,4-imidazolidinedione, 1,3-diphenyl-2-thio-2,4-imidazolidinedione, etc.; a 2-imidazolin1-5-one nucleus, e.g., 2-propylmercapto-2-imidazolin-5-one, etc.; etc. (Especially useful are nuclei wherein Q represents the non-metallic atoms required to complete a heterocyclic nucleus containing five to six atoms in the heterocyclic ring, three to four of said atoms being carbon, and two of said atoms being selected from the group consisting of nitrogen, oxygen, and sulfur, and at least one of said two atoms being a nitrogen atom.

The novel methine dyes of this invention can be conveniently prepared in a number of ways. For example, a number of the dyes defined by Formula I above are advantageously prepared by heating a mixture of (1) a heterocyclic salt of the formula:

III.

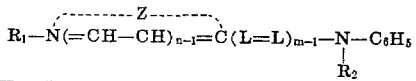

wherein m is 2 or 3, n, L, $R_1$, X and Z are previously defined, and $R_2$ represents a hydrogen atom or an acyl group, e.g., acetoxy, phenoxy, etc., with (2) an enamine intermediate selected from the group consisting of a 1-(3,4,4a,5,6,7-hexahydro-2-naphthyl)-pyrrolidine, or a 1(3,3a,4,5-tetrahydro-2H-inden-6-yl)pyrrolidone, or a 1-(2-norbornylidene)pyrrolidinium salt, e.g., the chloride, bromide, iodide, perchlorate, p-toluenesulfonate, etc. salt, or a 1-(1-indanylidene)pyrrolidinium salt, e.g., the chloride, bromide, iodide, perchlorate, p-toluenesulfonate, etc. salt, in approximately equimolar proportions, in a solvent medium such as ethanol, pyridine, N,N-dimethylacetamide, acetic anhydride, etc. Advantageously, a basic condensing agent such as triethylamine is used with the acetic anhydride reaction medium. The dyes are then separated from the reaction mixtures and purified by one or more recrystallizations from appropriate solvents such as methanol, mixtures of pyridine and methanol, and the like. The dyes wherein the value of m is 1 in Formula I above are advantageously prepared with (1) a heterocyclic salt of the formula:

IV.

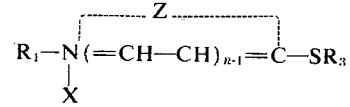

wherein n, $R_1$, X and Z are previously defined and $R_3$ represents an alkyl or aryl group, e.g., methyl, butyl, phenyl, etc., and (2) an enamine intermediate above defined, under generally similar reaction conditions and purification of the dyes as described in the preceding procedure.

The dyes defined by Formula II above are also prepared by the above procedure described for the dyes of Formula I using the same enamine intermediates except that the heterocyclic salt of Formula III is replaced by a ketomethylene heterocyclic compound of the formula:

V.

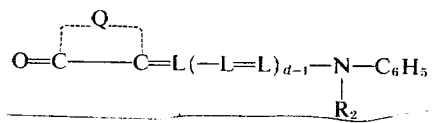

wherein d, L, $R_2$ and Q are as previously defined.

In the preparation of photographic emulsions, the new dyes of the invention are advantageously incorporated in the finished silver halide emulsion and should, of course, be uniformly distributed throughout the emulsion. The methods of incorporating dyes in emulsions are relatively simple and well known to those skilled in the art of emulsion making. For example, it is convenient to add the dyes from solutions in appropriate solvents, in which the solvent selected should have no deleterious effect on the ultimate light-sensitive materials. Methanol, isopropanol, pyridine, etc., alone or in combination have proven satisfactory as solvents for the majority of our new dyes. The type of silver halide emulsions that are sensitized with our dyes include any of those prepared with hydrophilic colloids that are known to be satisfactory for dispersing light-sensitive silver halides, for example, emulsions prepared with hydrophilic colloids, such as, natural materials, e.g., gelatin, albumin, agar-agar, gum arabic, alginic acid, etc., and synthetic hydrophilic resins, e.g., polyvinyl alcohol, polyvinyl pyrrolidone, cellulose ethers, partially hydrolyzed cellulose acetate, and the like.

The concentration of our new dyes in the emulsion can be widely varied, i.e., generally from about 5 to about 100 mg. per liter of flowable emulsion. The specific concentration will vary according to the type of light-sensitive material in the emulsion and according to the effects desired. The most advantageous dye concentration for any given emulsion can be readily determined by making the tests and observations customarily used in the art of emulsion making. The dyes of the invention can be used alone, in combination with each other or in combination with other sensitizing dyes. The emulsions are coated to advantage on any of the support materials used for photographic elements, for example, paper, glass, cellulose acetate, cellulose acetate-propionate, cellulose nitrate, polystyrene, polyesters, polyamides, etc.

To prepare a gelatino-silver halide emulsion sensitized with one of the new dyes, the following procedure is satisfactory: A quantity of the dye is dissolved in a suitable solvent and a volume of this solution containing from 5 to 100 mgs. of dye is slowly added to about 1000 cc. of a gelatino-silver halide emulsion. With most of the new dyes, 10 to 20 mgs. of dye per liter of emulsion suffice to produce the maximum sensitizing effect with the ordinary gelatino-silver halides including silver chloride, bromide bromoiodide, chlorobromide, chlorobromoiodide, etc. emulsions. With fine-grain emulsions, which include most of the ordinary employed gelatino-silver chloride emulsions and the like, somewhat larger concentrations of dye may be necessary to secure optimum sensitizing effect. While the preceding has dealt with emulsions comprising gelatin, it will be understood that these remarks apply generally to any emulsions wherein part or all of the gelatin is substituted by another suitable hydrophilic colloid such as mentioned above.

The above statements are only illustrative and are not to be understood as limiting the invention in any sense, as it will be apparent that the new dyes can be incorporated by other methods in many of the photographic silver halide emulsions customarily employed in the art. For instance, the dyes can be incorporated by bathing a plate or film upon which an emulsion has been coated, in the solution of the dye in an appropriate solvent. Bathing methods, however, are not to be preferred ordinarily.

Photographic silver halide emulsions, such as those listed above, containing the sensitizing dyes of my invention can also contain such addenda as chemical sensitizers, e.g., sulfur sensitizers (e.g., allyl thiocarbamide, thiourea, allylisothiocyanate, cystine, etc.), various gold compounds (e.g., potassium chloroaurate, auric trichloride, etc.) (see U.S. Pats. Nos. to W. D. Baldsiefen 2,540,085, granted Feb. 6, 1951; R. E. Damschroder 2,597,856, granted May 27, 1952, and H. C. Yutzy et al. 2,597,915, granted May 27, 1952), various palladium compounds, such as palladium chloride (W. D. Baldsiefen U. S. Pat. No. 2,540,086, granted Feb. 6, 1951), potassium chloropalladate (R. E. Stauffer et al U. S. Pat. No. 2,598,079, granted May 27, 1952), etc., or mixture of such sensitizers; antifoggants, such as ammonium chloroplatinate (A. P. H. Trivelli et al. U. S. Pat. No. 2,566,245, granted Aug. 28, 1951), ammonium chloroplatinite (A.P.H. Trivelli et al. U.S. Pat. No. 2,566,263, granted Aug. 28, 1951), benzotriazole, nitrobenzimidazole, 5-nitroindazole, benzidine, mercaptans, etc. (see Mees, "The Theory of the Photographic Process", Macmillan Pub., 1942, page 460), or mixtures thereof; hardeners, such as formaldehyde (A. Miller U.S. Pat. No. 1,763,533, granted June 10, 1930), chrome alum (U.S. Pat. No. 1,763,533), glyoxal (J. Brunken U. S. Pat. No. 1,870,354, granted Aug. 9, 1932, dibromacrolein (O. Block et al. British Pat. No. 406,750, accepted Mar. 8, 1934), etc.; color couplers, such as those described in I. F. Salminen et al. U. S. Pat. No. 2,423,730, granted July 7, 1947, Spence and Carroll U. S. Pat. No. 2,640,776, issued June 2, 1953, etc.; or mixtures of such addenda. Dispersing agents for color couplers, such as those set forth in U. S. Pats. Nos. to E. E. Jelley et al. 2,322,027, granted June 15, 1943, and L. D. Mannes et al. 2,304,940, granted Dec. 15, 1942, can also be employed in the above-described emulsions.

The following examples further illustrate the novel dyes and photographic materials of this invention.

Example 1

3-ethyl-2-{2-[2,3,4,4a,5,6-hexahydro-7-(1-pyrrolidinyl)-1-naphthyl]vinyl} benzoxazolium iodide

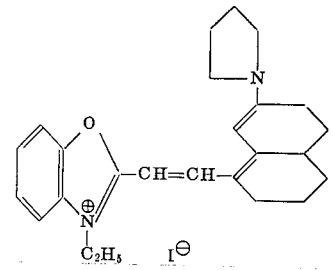

1-(3,4,4a,5,6,7-hexahydro-2-naphthyl)pyrrolidine (2.0 g.) and 2-(2-acetanilidovinyl)-3-ethylbenzoxazolium iodide (4.3 g.) are dissolved in ethanol (15 ml.) and heated at reflux for 10 minutes. After chilling, the crude dye is collected on a filter and dried. After one recrystallization from methanol, the yield of purified dye is 1.8 g. (36 percent), m.p. 212°–213° C., dec.

Example 2

3-ethyl-2-{2-[2,3,4,4a,5,6-hexahydro-7-(1-pyrrolidinyl)-1-naphthyl]vinyl} benzothiazolium iodide

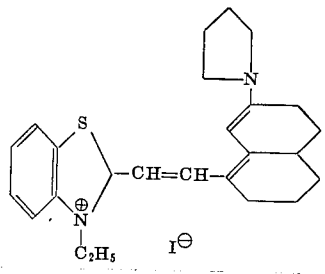

1-(3,4,4a,5,6,7-hexahydro-2-naphthyl)pyrrolidine (2.0 g.) and 2-(2-acetanilidovinyl)3-ethylbenzothiazolium iodide (4.5 g.) are dissolved in ethanol (15 ml.) and heated at reflux for 10 minutes. After chilling, the crude dye is collected on a filter and dried. After one recrystallization from methanol, the yield of purified dye is 1.8 g. (35 percent), m.p. 240°–241° C. dec.

Example 3

3-ethyl-5-{[2,3,4,4a,5,6-hexahydro-7-(1-pyrrolidinyl)-1-naphthyl]methylene}rhodanine

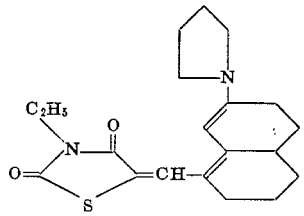

1-(3,4,4a,5,6,7-hexahydro-2-naphthyl)pyrrolidine (2.0 g.) and 5-acetanilidomethylene-3-ethylrodanine (3.1 g.) are dissolved in ethanol (15 ml.) and heated at reflux for 3 minutes. After chilling, the crude dye is collected on a filter and dried. After one recrystallization from pyridine/methanol, the yield of purified dye is 2.0 g. (54 percent), m.p. 198°–199° C. dec.

Example 4

3-ethyl-2-[2,6,7,7a-tetrahydro-5-(1-pyrrolidinyl)-3-indenyl]benzothiazolium perchlorate

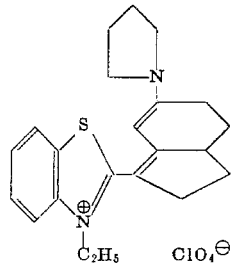

1-(3,3a,4,5-tetrahydro-2H-iden-6-yl)pyrrolidone (1.9 g.) and 3-ethyl-2-phenylthiobenzothiazolium iodide (4.0 g.) are dissolved in ethanol (15 ml.) and heated at reflux for 5 minutes. A hot aqueous solution (10 ml.) of $NaClO_4$ (1.8 g.) is then added. After chilling, the crude dye is collected on a filter and recrystallized from N,N-dimethylacetamide/methanol. The yield of purified dye is 0.9 g. (20 percent) m.p. 270°–271° C. dec.

Example 5

3-ethyl-2-{2-[2,6,7,7a-tetrahydro-5-(1-pyrrolidinyl)-3-indenyl]vinyl}benzoxazolium iodide

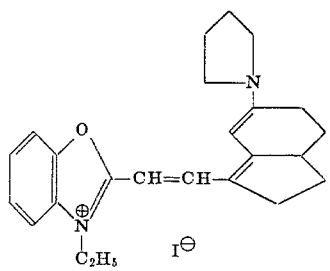

1-(3,3a,4,5-tetrahydro-2H-inden-6-yl)pyrrolidine (1.9 g.) and 2-(2-acetanilidovinyl)-3-ethylbenzoxazolium iodide (4.3 g.) are dissolved in ethanol (15 ml.) and heated at reflux for 5 minutes. After chilling, the crude dye is collected on a filter and dried. After one recrystallization from methanol, the yield of purified dye is 2.3 g. (47 percent), m.p. 258°–259° C. dec.

Example 6

3-ethyl-2-{2-[2,6,7,7a-tetrahydro-5-(1-pyrrolidinyl)-3-indenyl]vinyl}benzothiazolium iodide

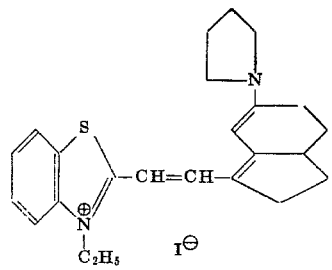

1-(3,3a,4,5-tetrahydro-2H-inden-6-yl)pyrrolidine (1.9 g.) and 2-(2-acetanilidovinyl)-3-ethylbenzothiazolium iodide (4.5 g.) are dissolved in ethanol (15 ml.) and heated at reflux for 5 minutes. After chilling, the crude dye is collected on a filter and dried. After one recrystallization from methanol, the yield of purified dye is 2.1 g. (42 percent), m.p. 252°–253° C. dec.

Example 7

3-phenyl-4-{[2,6,7,7a-tetrahydro-5-(1-pyrrolidinyl)-3-indenyl]methylene}2-isoxazolin-5-one

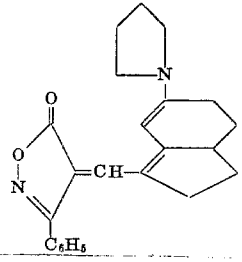

4-Anilinomethylene-3-phenyl-2-isoxazoline-5-one (2.6 g.) is stirred with N,N-dimethylacetamide (10 ml.) for several minutes at room temperature. Acetic anhydride (1.0 ml.) is then added, the mixture stirred for several additional minutes and triethylamine (1.5 ml.) and 1-(3,3a,4,5- tetrahydro-2H-inden-6-yl)pyrrolidine (1.9 g.) are added. The mixture was stirred for 1½ hours at room temperature, the solid collected on a filter, rinsed with ethanol and dried. After one recrystallization from pyridine/ethanol, the yield of purified dye is 1.5 g. (42 percent), m.p. 224°–225°C. dec.

Example 8

3-methyl-1-phenyl-4-{[2,6,7,7a-tetrahydro-5-(1-pyrrolidinyl)-3-indenyl]methylene}-2-pyrazolin-5-one

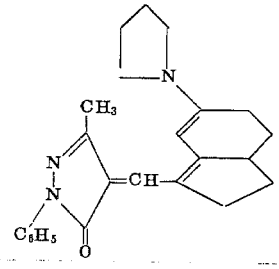

4-Anilinomethylene-3-methyl-1-phenyl-2-pyrazoline-5-one (2.8 g.) and 1-(3,3a,4,5-tetrahydro-2H-inden-6-yl)-pyrrolidine (1.9 g.) are condensed in N,N-dimethylacetamide (15 ml.) with acetic anhydride (1.0 ml.) and triethylamine (1.5 ml.) in the manner as in Example 7. After one recrystallization from pyridine/methanol, the yield of purified dye is 0.8 g. (22 percent), m.p. 220°–221°C. dec.

Example 9

3-ethyl-5-{[2,6,7,7a-tetrahydro-5-(1-pyrrolidinyl)-3-indenyl]methylene}rhodanine

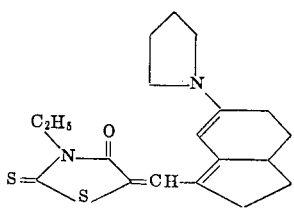

5-Acetanilidomethylene-3-ethylrhodanine (3.1 g.) and 1-(3,3a,4,5-tetrahydro-2H-inden-6-yl)pyrrolidine (1.9 g.) are dissolved in ethanol (20 ml.) and heated at reflux for 5 minutes. After chilling, the crude dye is collected on a filter, rinsed with ethanol and dried. After one recrystallization from pyridine/methanol, the yield of purified dye is 2,7 g. (75 percent), m.p. 221°–222°C. dec.

Example 10

3-ethyl-2-{2-[3-(1-pyrrolidinyl)-2-norbornen-2-yl]vinyl}benzoxazolium perchlorate

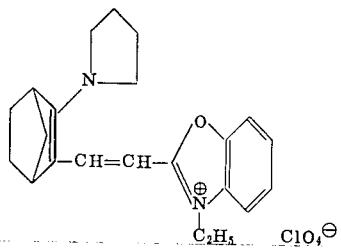

1-(2-Norbornylidene)pyrrolidinium perchlorate (2.6 g.), 2-(2-acetanilidovinyl)-3-ethylbenzoxazolium iodide (4.3 g.), and triethylamine (1.5 ml.) are dissolved in acetic anhydride (15 ml.) and heated at reflux with stirring, for 5 minutes. After cooling, ether (200 ml.) is added with stirring. Decanted, stirred residue with water (150 ml.) and decanted. The residue is then stirred with a little warm ethanol and crystals formed. After chilling, the solid is collected on a filter and dissolved in ethanol. After chilling, the mixture is filtered to remove unwanted material. The filtrate is concentrated to 50 ml. and chilled. The dye is then collected on a filter and dried. The yield is 0.7 g. (16 percent), m.p. 196°–197°C. dec.

Example 11

3-ethyl-2-{2-[3-(1-pyrrolidinyl)-2-norbornen-2-yl]vinyl}benzothiazolium perchlorate

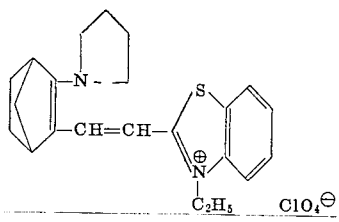

1-(2-Norbornylidene)pyrrolidinium perchlorate (2.6 g.), 2-(2-acetanilidovinyl)-3-ethylbenzothiazolium iodide (4.5 g.), and triethylamine (1.5 ml.) are dissolved in acetic anhydride (15 ml.) and heated at reflux, with stirring, for 5 minutes. After cooling, ether (200 ml.) is added with stirring. The liquid is decanted and the residue stirred with a fresh portion of ether (200 ml.), decanted and then the residue dissolved in ethanol, discarding some material that does not readily dissolve. After chilling, the solid is collected on a filter and dried. The yield is 1.2 g. (27 percent). The crude dye is recrystallized from methanol, with the hot solution being passed through a bed of Norite. The yield of purified dye is 0.6 g. (13 percent), m.p. 231°–232°C. dec.

Example 12

1,3,3-trimethyl-2-{2-[3-(1-pyrrolidinyl)-2-indenyl]vinyl}-3H-indolium perchlorate

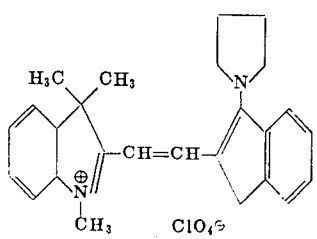

1-(2-Norbornylidene)pyrrolidinium perchlorate (2.6 g.), 2-(anilinovinyl)-1-ethylnaphtho[1,2-d]thiazolium p-toluenesulfonate (5.0 g.), acetic anhydride (1.0 ml.), and triethylamine (3.1 ml.) are dissolved in N,N-dimethylacetamide (15 ml.) and heated at reflux, with stirring for 5 minutes. The hot reaction mixture is diluted to 300 ml. with boiling methanol and then cooled to room temperature. After one recrystallization from N,N-dimethylacetamide/methanol, the dye is not pure. The dye is then combined with the recrystallization liquors and methanol added so as to have a total volume of 800 ml. The mixture is then heated to reflux and filtered (gravity). The filtrate is then heated to reflux and the solution is passed through a bed of Norite. The Norited solution is then heated to reflux and filtered (gravity). After concentrating to 400 ml., the solution is chilled, the dye collected on a filter and dried. The yield of purified dye is 1.6 g. (32 percent), m.p. 262°–263 °C. dec.

Example 13

3-ethyl-2-{2-[3-(1-pyrrolidinyl)-2-indenyl]vinyl}benzoxazolium perchlorate

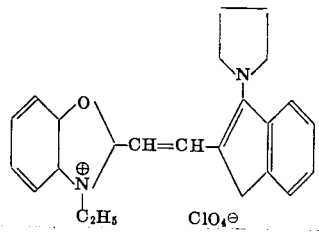

1-(1-Indanylidene)pyrrolidinium perchlorate (2.9 g.), 2-(2-acetanilidovinyl)-1,3,3 -trimethyl-3H-indolium iodide (4.5 g.), and triethylamine (1.5 ml.) are dissolved in pyridine (15 ml.) and heated to reflux, with stirring, for 10 min. After chilling, the solid is collected on a filter, rinsed with methanol and dried. The crude yield is 3.4 g. (72 percent). After two recrystallizations from pyridine, the yield of purified dye 1.6 g. (34 percent), m.p. 240°–241°C. dec.

Example 14

3-ethyl-2-{2-[3-(1-pyrrolidinyl)-2-indenyl]vinyl}benzothiazolium perchlorate

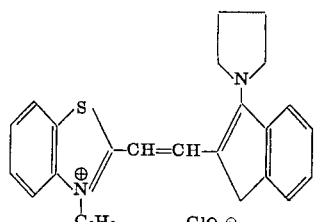

1-(1-Indanylidene)pyrrolidinium perchlorate (2.9 g.), 2-(2-acetanilidovinyl)-3-ethylbenzoxazolium iodide (4.3 g.), and triethylamine (1.5 ml.) are dissolved in pyridine (15 ml.)

and heated at reflux, with stirring for 10 minutes. After chilling, the solid is collected on a filter, washed with methanol and dried. The crude yield is 3.0 (65 percent). After two recrystallizations from pyridine, the yield of purified dye is 1.1 g. (24 percent), m.p. 279°–280°C. dec.

Example 15

1-ethyl-2-{2-[3-(1-pyrrolidinyl)-2-indanyl]vinyl}naphtho[1,2-d]thiazolium perchlorate

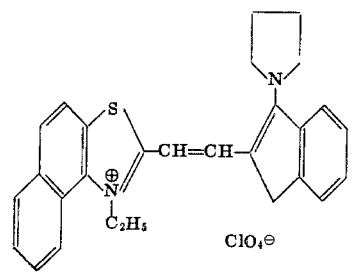

1-(1-Indanylidene)pyrrolidinium perchlorate (2.9 g.), 2-(2-acetanilidovinyl)-3-ethylbenzothiazolium iodide (4.5 g.), and triethylamine (1.5 ml.) are dissolved in pyridine (15 ml.) and heated at reflux, with stirring, for 10 minutes. After chilling, the solid is collected on a filter, washed with methanol and dried. The crude yield is 3.8 g. (81 percent). After one recrystallization from pyridine followed by one recrystallization from cresol/methanol, the yield of purified dye is 0.7 g. (15 percent), m.p. 281°–282°C. dec.

Example 16

1-ethyl-2-{2-[3-(1-pyrrolidinyl)-2-norbornen-2-yl]vinyl}naphtho[1,2-d]thiazolium perchlorate

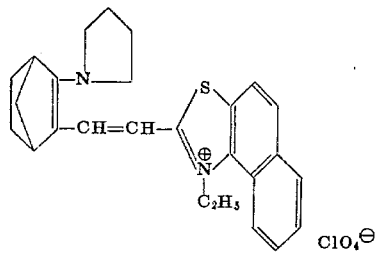

1-(1-Indanylidene)pyrrolidinium perchlorate (2.9 g.), 2-(2-anilinovinyl)-1-ethylnaphtho[1,2-d]thiazolium p-toluene sulfonate (5.0 g.), acetic anhydride (1.0 ml.), and triethylamine (2.8 ml.) are dissolved in pyridine (25 ml.) and heated at reflux, with stirring, for 5 minutes. After chilling, the solid is collected on a filter, washed with methanol and dried. The crude yield is 4.6 g. (88 percent). After two recrystallizations from cresol/methanol, the yield of purified dye is 3.0 g. (58 percent), m.p. 287°–288°C. dec.

The dyes prepared as described in the above examples are tested in a silver bromoiodide emulsion containing 0.77 mole percent iodide of the type described by Trivelli and Smith, *Phot. Journal*, 79, 330 (1939). The dyes, dissolved in suitable solvents, are added to separate portions of the emulsion at the concentrations indicated. After digestion at 52° C. for 10 minutes, the emulsions are coated at a overage of 432 mg. of silver per square foot on a cellulose acetate film support. A sample of each coating is exposed on an Eastman IB Sensitometer and to a edge spectrograph, processed for 3 minutes in Kodak developer D–19 which has the following composition:

| | |
|---|---|
| N-methyl-p-aminophenol sulfate | 2.0 g. |
| Hydroquinone | 8.0 g. |
| Sodium sulfite (desiccated) | 90.0 g. |
| Sodium carbonate (monohydrate) | 52.5 g. |
| Potassium bromide | 5.0 g. |
| Water to make | 1.0 liter | and then fixed in a conventional sodium thiosulfate fixing bath, washed and dried. The sensitizing values obtained are shown in Table I immediately below.

Table I

| Dye of Example No. | Dye Conc. (g./mole Ag.) | Sensitization Range (nm.) | Sensitization Max. (nm.) |
|---|---|---|---|
| 1 | 0.02 | to 690 | 640 |
| 2 | 0.02 | to 740 | 680 |
| 3 | 0.02 | to 740 | 680 |
| 4 | 0.02 | to 580 | 530 |
| 5 | 0.02 | to 680 | 620 |
| 6 | 0.02 | to 710 | 660 |
| 7 | 0.02 | to 580 | 530 |
| 8 | 0.02 | to 590 | 570 |
| 9 | 0.02 | to 710 | 650 |
| 10 | 0.04 | to 540 | 500 |
| 11 | 0.04 | to 580 | 535 |
| 12 | 0.04 | to 620 | 550 |
| 13 | 0.04 | to 620 | 570 |
| 14 | 0.04 | to 610 | 550 |
| 15 | 0.04 | to 645 | 580 |
| 16 | 0.04 | to 660 | 615 |

The results shown in above Table I indicate that all of the dyes of the preceding examples are excellent spectral sensitizers for light-sensitive photographic silver halide emulsions of the negative type. It is to be noted that in some instances the sensitivity of the test emulsion is extended into the near infrared regions of the spectrum.

The following examples illustrate the preparation of certain fused carbocyclic enamine intermediates that are employed in the preceding examples.

Example 17

1-(3,3a,4,5-Tetrahydro-2H-inden-6-yl)pyrrolidine

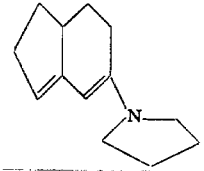

To a solution of N-cyclopentenylpyrrolidine (41.1 g.) in toluene (250 ml.) is added 3-buten-2-one (21.0 g.) dropwise. The mixture is then heated at reflux for 15 hours. The water that forms is azeotroped, the toluene removed under reduced pressure and the residue distilled under vacuum. The yield of product is 26.2 g. (46 percent), b.p. 109°C./0.09 mm. Hg.

Example 18

1-(2-Norbornylidene)pyrrolidinium perchlorate

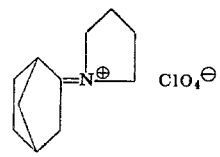

2-Norbornanone (11.0 g.) and pyrrolidine hydroperchlorate (17.1 g.) are dissolved in ethanol (50 ml.). Pyrrolidine (1 drop) is added and the mixture is stirred for 10 minutes. The solid is collected on a filter, rinsed thoroughly with ethanol and dried. The yield is 19.9 g. (75 percent), m.p. 226°–227°C.

Example 19

1-(1-Indanylidene)pyrrolidinium perchlorate

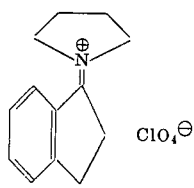

1-Indanone (22.0 g.), pyrrolidinium hydroperchlorate (22.5 g.) and pyrrolidine (4 drops) are dissolved in ethanol (75 ml.) and heated at reflux for 1 hour. After chilling, the solid is collected on a filter, rinsed with ethanol and dried. The yield is 24.7 g. (66 percent), m.p. 208°–209°C.

The preparation of the intermediate 1-(3,4,4a,5,6,7-hexahydro-2-naphthyl)pyrrolidine is described by Stork et al, J. Amer. Chem. Society, 85, 218 (1963).

It will be apparent from all of the foregoing description and examples, that still other novel dyes of the invention embraced by Formulas I and II above can be prepared by appropriate selection of the heterocyclic and enamine type intermediates, and that these dyes likewise will function as effective spectral sensitizers for light-sensitive negative photographic silver halide emulsions.

Other dyes which are useful in the practice of this invention and can be prepared by the procedures described above, include 3-ethyl-5-{[2,3,4,4a,5,6-hexahydro-7-(1-pyrrolidinyl)-1-naphthyl]allylidene}rhodanine; 3-ethyl-2-{2-[2,6,7,7a-tetra-hydro-5-(1-pyrrolidinyl)-3-indenyl]butadienyl}benzothiazolium iodide; 1-phenyl-2-{2-[3-(1-pyrrolidinyl)-2-norbornen-2-yl]vinyl}-naphtho[1,2-d]thiazolium perchlorate; and 1-ethyl-4-{2-[3-(1-pyrrolidinyl)-2-indenyl]vinyl}quinoxalinium perchlorate.

The invention has been described in detail with particular reference to preferred embodiments thereof, but, it will be understood that variations and modifications can be effected within the spirit and scope of the invention.

We claim:

1. A light-sensitive photographic silver halide emulsion spectrally sensitized with a methine dye comprising first and second nuclei joined by a linkage selected from the group consisting of a double bond and methine linkage; the first of said nuclei being selected from the group consisting of (1) a nitrogen containing heterocyclic nucleus having from 5 to 6 atoms in the heterocyclic ring, and (2) a nitrogen containing heterocyclic ketomethylene nucleus having from five to six atoms in the heterocyclic ring, said first nucleus being joined by a carbon atom thereof to said linkage; and said second nucleus being an enamine group selected from the group consisting of a 1-(3,4,4a,5,6,7-hexahydro-2-naphthyl)pyrrolidine group, a 1-(3,3a,4,5-tetrahydro-2H-inden-6-yl)pyrrolidine group, a 1-(2-norbornylidene)pyrrolidine group and a 1-(1-indanylidene)-pyrrolindine group, joined at a carbon atom thereof to said linkage.

2. A light-sensitive photographic silver halide emulsion spectrally sensitized with a methine dye having at least one of the following formulas:

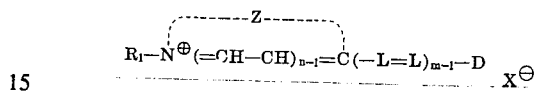

and

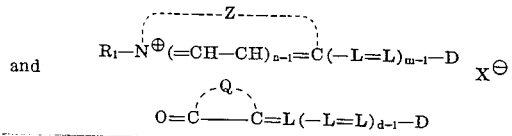

wherein $d$ and $n$ each represents a positive integer of from 1 to 2; $m$ represents a positive integer of from 1 to 3; L represents a methine linkage; D represents an enamine group selected from the group consisting of a 2,3,4,4a,5,6-hexahydro-7-(1-pyrrolidinyl)-1-naphthyl group; a 2,6,7,7a-tetrahydro-5-(1-pyrrolidinyl)-3-indenyl group; a 3-(1-pyrrolidinyl)-2-norbornen-2-yl group; and a 3-(1-pyrrolidinyl)-2-indenyl group; $R_1$ represents a member selected from the group consisting of an alkyl group and an aryl group; X represents an acid anion; Z represents the non-metallic atoms necessary to complete a heterocyclic nucleus containing from five to six atoms in the heterocyclic ring; and Q represents the non-metallic atoms to complete a nitrogen containing heterocyclic ketomethylene nucleus containing from five to six atoms in the heterocyclic ring.

3. A light-sensitive photographic silver halide emulsion spectrally sensitized with a methine dye represented by the following formula:

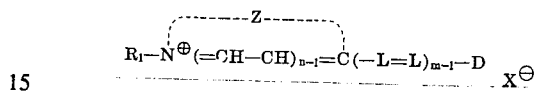

wherein $n$ represents a positive integer of from 1 to 2; $m$ represents a positive integer of from 1 to 3; L represents a methine linkage; D represents an enamine group selected from the group consisting of a 2,3,4,4a,5,6-hexahydro-7-(1-pyrrolidinyl)-1-naphthyl group; a 2,6,7,7a-tetrahydro-5-(1-pyrrolidinyl)-3-indenyl group; a 3-(1-pyrrolidinyl)-2-norbornen-2-yl group; and a 3-(1-pyrrolidinyl)-2-indenyl group; $R_1$ represents a member selected from the group consisting of an alkyl group and an aryl group; X represents an acid anion; and Z represents the non-metallic atoms necessary to complete a heterocyclic nucleus containing from five to six atoms in the heterocyclic ring.

4. A light-sensitive photographic silver halide emulsion spectrally sensitized with a dye as defined in claim 4 wherein said Z represents the non-metallic atoms necessary to complete a thiazole nucleus.

5. A light-sensitive photographic silver halide emulsion spectrally sensitized with a dye as defined in claim 3 wherein said Z represents the non-metallic atoms necessary to complete an oxazole nucleus.

6. A light-sensitive photographic silver halide emulsion spectrally sensitized with a dye as defined in claim 3 wherein said Z represents the non-metallic atoms necessary to complete a 3,3-dialkylindolenine nucleus.

7. A light-sensitive photographic silver halide emulsion spectrally sensitized with a methine dye represented by the following formula:

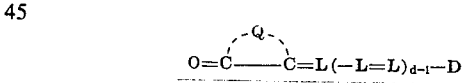

wherein $d$ represents a positive integer of from 1 to 2; L represents a methine linkage; D represents an enamine group selected from the group consisting of a 2,3,4,4a,5,6-hexahydro-7 -(1-pyrrolidinyl)-1-naphthyl group, a 2,6,7,7a-tetrahydro-5-(1-pyrrolidinyl)-3-indenyl group; a 3-(1-pyrrolidinyl)-2-norbornen-2-yl group; and a 3-(1-pyrrolidinyl)-2-indenyl group; and Q represents the non-metallic atoms to complete a nitrogen containing heterocyclic ketomethylene nucleus having from five to six atoms in the heterocyclic nucleus.

8. A light-sensitive photographic silver halide emulsion spectrally sensitized with dye as defined in claim 7 wherein said Q represents the non-metallic atoms necessary to complete a rhodanine nucleus, and wherein said D represents a 2,3,4,4a,5,6-hexahydro-7-(1-pyrrolidinyl)-1-naphthyl group.

9. A light-sensitive photographic silver halide emulsion spectrally sensitized with dye as defined in claim 7 wherein said Q represents the non-metallic atoms necessary to complete a rhodanine nucleus, and wherein said D represents a 2,6,7,7a-tetrahydro-5-(1-pyrrolidinyl)-3-indenyl group.

10. A light-sensitive photographic silver halide emulsion spectrally sensitized with dye as defined in claim 7 wherein said Q represents the non-metallic atoms necessary to complete an isoxazolone nucleus, and wherein said D represents a 2,6,7,7a-tetrahydro-5-(1-pyrrolidinyl)-3-indenyl group.

11. A light-sensitive photographic silver halide emulsion spectrally sensitized with dye as defined in claim 7 wherein said Q represents the non-metallic atoms necessary to complete a 2-pyrazoline-5-one nucleus, and wherein said D represents a 2,6,7,7a-tetrahydro-5-(1-pyrrolidinyl)-3-indenyl group.

12. A light-sensitive photographic silver halide emulsion spectrally sensitized with a methine dye selected from the group consisting of 3-ethyl-2-{2-[2,3,4,4a,5,6-hexahydro-7-(1-pyrrolidinyl)-1-naphthyl]vinyl}benzoxazolium iodide; 3-ethyl-2-{2-[2,3,4,4a-5,6-hexahydro-7-(1-pyrrolidinyl)-1-naphthyl]vinyl}benzothiazolium iodide; 3-ethyl-5-{[2,3,4,4a,5,6-hexahydro-7-(1-pyrrolidinyl)-1-naphthyl]methylene}rhodanine; 3-ethyl-2-[2,-6,7,7a-tetrahydro-5-(1-pyrrolidinyl)-3-indenyl]benzothiazolium perchlorate; 3-ethyl-2-{2-[2,6,7,7a-tetrahydro-5-(1-pyrrolidinyl)-3-indenyl]vinyl}benzoxazolium iodide; 3-ethyl-2-{2-[2,6,7,7a-tetrahydro-5-(1-pyrrolidinyl)-3-indenyl]vinyl}benzothiazolium iodide; 3-phenyl -4-{[2,6,7,7a-tetrahydro-5-(1-pyrrolidinyl)-3-1indenyl]methylene}-2-ioxzazoline-5-one; 3-methyl-1-phenyl-4-{[2,6,7,7a5-(1-pyrrolidinyl)-3-indenyl]methylene}-2-pyrazoline-5-one; 3-ethyl-5-{[ 2,6,7,7a-tetrahydro-5-(1-pyrrolidinyl)-3-indenyl]methylene}rhodanine; 3-ethyl-2-{2-[3-(1-pyrrolidinyl)-2-norbornen-2-yl]vinyl}benzoxazolium perchlorate; 3-ethyl-2-{2-[3-(1-pyrrolidinyl)-2-norbornen-2-yl]vinyl}benzothiazolium perchlorate; 1-ethyl-2-{2-[3-(1-pyrrolidinyl)-2-norbornen-2-yl]vinyl}naphtho[1,2-d]thiazolium perchlorate; 1,3,3-trimethyl-2-{2-[3-(1-pyrrolidinyl)-2-indenyl]vinyl}-3H-indolium perchlorate; 3-ethyl-2-{2-[3(1-pyrrolidinyl)-2-indenyl]vinyl}benzoxazolium perchlorate; 3-ethyl-2-{2-[3-(1-pyrrolidinyl)-2-indenyl]vinyl}benzoxazolium perchlorate;3-ethyl-2-{2-[3-(1-pyrrolidinyl)-2-indenyl]vinyl}benzothiazolium perchlorate and 1-ethyl-2-{2-[3-(1-pyrrolidinyl)-2-indanyl]vinyl}naphtho[1,2-d]thiazolium perchlorate.

13. A light-sensitive photographic silver halide emulsion spectrally sensitized with 3-ethyl-2-{2-[2,3,4,4a,5,6-hexahydro-7-(1-pyrrolidinyl)-1-naphthyl]vinyl}benzothiazolium iodide.

14. A light-sensitive photographic silver halide emulsion spectrally sensitized with 3-ethyl-5-{[2,3,4,4a,5,6-hexahydro-7-(1-pyrrolidinyl)-1-naphthyl]methylene}rhodanine.

* * * * *

PO-1050
(5/69)

UNITED STATES PATENT OFFICE
CERTIFICATE OF CORRECTION

Patent No. 3,655,392                    Dated April 11, 1972

Inventor(s) Arthur Fumia, Jr. and Leslie G.S. Brooker

It is certified that error appears in the above-identified patent and that said Letters Patent are hereby corrected as shown below:

Column 2, line 5, delete "5,6hexahydro" and insert ---5,6-hexahydro---.

Column 2, line 29, delete "alkoxy-alkyl" and insert ---alkoxyalkyl---.

Column 2, line 30, delete "car-boxyalkyl" and insert ---carboxyalkyl---.

Column 1, line 57, delete "hetrocyclic" and insert ---heterocyclic---.

Column 2, line 62, delete "methoxynaphtoh" and insert ---methoxynaphtho---.

Column 2, line 68, delete "benzoxa-zole" and insert ---benzoxazole---.

Column 2, line 69, delete "phenylbenzox-azole" and insert ---phenylbenzoxazole---.

Column 2, line 70, delete "di-methylbenzoxazole" and insert ---dimethylbenzoxazole---.

Column 3, line 12, delete "dimethylinolenine" and insert ---dimethylindolenine---.

Column 3, line 22, delete "pyrazoline" and insert ---pyrazolin---.

Column 3, line 24, delete "benxothiazolyl" and insert ---benzothiazolyl---.

Column 3, line 50, delete "2thio" and insert ---2-thio---.

UNITED STATES PATENT OFFICE
CERTIFICATE OF CORRECTION

Patent No. 3,655,392                                  Dated April 11, 1972

Inventor(s) Arthur Fumia, Jr. and Leslie G.S. Brooker

It is certified that error appears in the above-identified patent and that said Letters Patent are hereby corrected as shown below:

Column 3, line 60, delete "thiazolidinedione" and insert ---thiazolidinone---.

Column 3, line 61, delete "thiazoline" and insert ---thiazolin---.

Column 3, line 62, delete "thiazoline" and insert ---thiazolin---.

Column 4, line 2, delete "1,1,3-diethyl" and insert ---1,3-diethyl---.

Column 4, line 6, delete "imidazolinl" and insert ---imidazolin---.

Column 4, line 28, delete "1(3,3a" and insert ---1-(3,3a ---.

Column 7, line 40, delete "iden" and insert ---inden--- and delete "pyrrolidone" and insert ---pyrrolidine---.

Column 8, line 40, delete "isoxazoline" and insert ---isoxazolin---.

Column 8, line 69, delete "pyrazoline" and insert ---pyrazolin---.

Column 9, line 18, delete "2,7" and insert ---2.7---.

Column 10, lines 3-15, the compound name and structural formula should read as follows:
--- 1-ethyl-2-{2-[3-(1-pyrrolidinyl)-2-norbornen-2-yl]vinyl}-naphtho[1,2-d]thiazolium perchlorate

PO-1050
(5/69)

UNITED STATES PATENT OFFICE
CERTIFICATE OF CORRECTION

Patent No. 3,655,392              Dated April 11, 1972

Inventor(s) Arthur Fumia, Jr. and Leslie G.S. Brooker

It is certified that error appears in the above-identified patent and that said Letters Patent are hereby corrected as shown below:

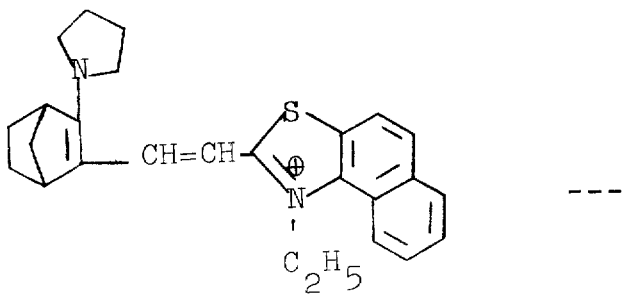

The formulas/in Examples 12, 13, 14, and 15 should appear in Examples 13, 14, 15 and 16 respectively. (and compound names)

The substituted formula for Example 14 should read as follows:

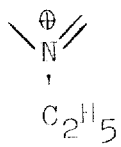

The substituted compound name for Example 16 should read: deleting "thiazoliumr" and inserting ---thiazolium---.

Column 11, line 64, delete "overage" and insert ---coverage---.

Column 13, line 31, delete "tetra-hydro" and insert ---tetrahydro---.

Column 13, line 56, delete "pyrrolindine" and insert ---pyrrolidine---.

Column 14, line 30, delete "4" and insert ---3---.

Column 15, line 5, delete "pyrazoline" and insert ---pyrazolin-

Page 4

PO-1050
(5/69)

UNITED STATES PATENT OFFICE
CERTIFICATE OF CORRECTION

Patent No. 3,655,392    Dated April 11, 1972

Inventor(s) Arthur Fumia, Jr. and Leslie G.S. Brooker

It is certified that error appears in the above-identified patent and that said Letters Patent are hereby corrected as shown below:

Column 15, line 15, delete "2,-6,7,7a" and insert ---2,6,7,7a---.

Column 15, line 20, delete "3-linde-" and insert --- 3-inde- ---.

Column 15, line 22, delete "2,6,7,7a5-" and insert ---2,6,7,7a-tetrahydro-5- ---.

Column 16, line 7, delete "3(1-" and insert --- 3-(1- ---.

Column 16, lines 8-10, delete "3-ethyl-2-{2-[3-(1-pyrrolidinyl)-2-indenyl]vinyl}benzoxazolium perchlorate;".

Column 16, line 10, delete "pyrolidinyl" and insert ---pyrrolidinyl---.

Signed and sealed this 12th day of Septembert 1972.

(SEAL)
Attest:

EDWARD M. FLETCHER, JR.
Attesting Officer

ROBERT GOTTSCHALK
Commissioner of Patents